United States Patent
Kim et al.

(10) Patent No.: US 9,473,777 B2
(45) Date of Patent: Oct. 18, 2016

(54) VIDEO ENCODING DEVICE AND ENCODING METHOD THEREOF, VIDEO DECODING DEVICE AND DECODING METHOD THEREOF, AND DIRECTIONAL INTRA-PREDICTION METHOD TO BE USED THERETO

(75) Inventors: Sunyeon Kim, Seoul (KR); Jeongyeon Lim, Gyeonggi-do (KR); Gyumin Lee, Gyeonggi-do (KR); Jaehoon Choi, Gyeonggi-do (KR); Jechang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 810 days.

(21) Appl. No.: 13/513,302

(22) PCT Filed: Nov. 25, 2010

(86) PCT No.: PCT/KR2010/008387
§ 371 (c)(1),
(2), (4) Date: Aug. 31, 2012

(87) PCT Pub. No.: WO2011/068331
PCT Pub. Date: Jun. 9, 2011

(65) Prior Publication Data
US 2012/0320975 A1    Dec. 20, 2012

(30) Foreign Application Priority Data
Dec. 3, 2009   (KR) .................. 10-2009-0119264

(51) Int. Cl.
*H04N 19/11* (2014.01)
*H04N 19/593* (2014.01)

(52) U.S. Cl.
CPC ............ *H04N 19/11* (2014.11); *H04N 19/593* (2014.11)

(58) Field of Classification Search
CPC ............................ H04N 19/11; H04N 19/593
See application file for complete search history.

(56) References Cited

U.S. PATENT DOCUMENTS

2005/0201463 A1*   9/2005   Lee et al. ................. 375/240.16
2006/0104354 A1*   5/2006   Han et al. ................. 375/240.03
(Continued)

FOREIGN PATENT DOCUMENTS

| KR | 10-0679025 | 2/2007 |
| KR | 10-0679031 | 2/2007 |
| KR | 10-0703748 | 4/2007 |

OTHER PUBLICATIONS

International Search Report mailed Jul. 26, 2011 for PCT/KR2010/008387.

*Primary Examiner* — Peter D Le
(74) *Attorney, Agent, or Firm* — Hauptman Ham, LLP

(57) ABSTRACT

The present disclosure provides a video encoding apparatus and encoding method thereof, video decoding apparatus and decoding method thereof, and directional intra-prediction method to be used therefor. The video encoding apparatus includes a main mode search unit for searching for main mode for a current block from among directional intra-prediction modes; a sub mode search unit for searching for sub modes formed by inclining indicated orientation of found main mode by main mode search unit by a predetermined offset in both clockwise and counterclockwise directions; a predicted block generator for generating predicted block of the current block from neighboring blocks of the current block based on found main mode by the main mode search unit and found sub modes by the sub mode search unit; a differentiator for calculating differential between the current block and the predicted block; and an encoder for encoding calculated differential by the differentiator.

9 Claims, 21 Drawing Sheets

(56) References Cited

U.S. PATENT DOCUMENTS

| | | | |
|---|---|---|---|
| 2006/0120450 A1* | 6/2006 | Han et al. | 375/240.03 |
| 2007/0019726 A1* | 1/2007 | Cha et al. | 375/240.12 |
| 2008/0123947 A1* | 5/2008 | Moriya et al. | 382/166 |
| 2008/0123977 A1* | 5/2008 | Moriya et al. | 382/238 |
| 2008/0240249 A1* | 10/2008 | Chien et al. | 375/240.17 |
| 2010/0239002 A1* | 9/2010 | Park et al. | 375/240.12 |

\* cited by examiner

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

VIDEO ENCODING DEVICE AND ENCODING METHOD THEREOF, VIDEO DECODING DEVICE AND DECODING METHOD THEREOF, AND DIRECTIONAL INTRA-PREDICTION METHOD TO BE USED THERETO

CROSS REFERENCE TO RELATED APPLICATION

This application claims the priority of Korean Patent Application No. 10-2009-0119264, filed on Dec. 3, 2009 in the KIPO (Korean Intellectual Property Office). Further, this application is the National Phase application of International Application No. PCT/KR2010/008387 filed Nov. 25, 2010, which designates the United States and was published in Korean.

TECHNICAL FIELD

The present disclosure relates to a video encoding apparatus and an encoding method thereof, a video decoding apparatus and a decoding method thereof, and a directional intra-prediction method to be used therefor. More particularly, the present disclosure relates to a video encoding apparatus and an encoding method thereof, a video decoding apparatus and a decoding method thereof, and a directional intra-prediction method to be used therefor, which can improve the accuracy and efficiency of an intra-prediction in a video encoding while not greatly increasing overheads in a bitstream generation in comparison with the H.264 standard by defining 9 prediction modes by the H.264 standard as main modes, defining sub modes as generated by inclining the orientations indicated by the main mode by a predetermined offset in a clockwise direction and a counterclockwise direction, and determining a predicted block based on the main modes and the sub modes.

BACKGROUND

The statements in this section merely provide background information related to the present disclosure and may not constitute prior art.

Following the development of information and communication technology including the Internet, communication is on the rise in the form of video as well as text and voice. Users unsatisfied with existing text-oriented communication services are being offered an increasing number of multimedia services encompassing texts, images, music, and various types of information. The enormous quantity inherent to multimedia data calls for larger and larger storage capacities and broader bandwidths. Therefore, compressive coding technologies have become a requisite in transmitting multimedia data including text, video, and audio.

A basic principle of compressing a data includes a process of removing a factor of the data redundancy. The data can be compressed by removing the spatial redundancy corresponding to the repetition of the same color or object in an image, the temporal redundancy corresponding to the repetition of the same note in an audio or a case where there is little change of an adjacent frame in a video, or the psychological vision redundancy considering a fact that human's visual and perceptive abilities are insensitive to a high frequency.

As a dynamic image or video compressing method, H.264/AVC recently draws interest with its more improved compression efficiency in comparison with MPEG-4 (Moving Picture Experts Group-4).

The H.264 is a digital video codec standard having a very high data compression rate, and is also referred to as MPEG-4 part 10 or AVC (Advanced Video Coding). This standard is a result generated by making a Joint Video Team and performing the standardization together by VCEG (Video Coding Experts Group) of ITU-T (International Telecommunication Union Telecommunication Standardization Sector) and MPEG of ISO/IEC (International Standardization Organization/International Electrotechnical Commission).

Various methods to improve the compression efficiency in a compression encoding are proposed, and include representative methods of using a temporal prediction and a spatial prediction as methods.

As shown in FIG. 1 for predicting a current block 112 of a current frame 110, the temporal prediction scheme performs a prediction with reference to a reference block 122 of another temporally adjacent frame 120. That is, in inter-predicting the current block 112 of the current frame 110, searching is performed for the temporally adjacent reference frame 120 in which the reference block 122 that is most similar to the current block is then searched for. Here, the reference block 122 is a block, which can predict the current block 112 best, and a block having the smallest SAD (Sum of Absolute Difference) from the current block 112 can be the reference block 122. The reference block 122 becomes a predicted block of the current block 112, and a residual block is generated by subtracting the reference block 122 from the current block 112. The generated residual block is encoded and inserted in a bitstream. In this event, the relative difference between a position of the current block in the current frame 110 and a position of the reference block 122 in the reference frame 120 corresponds to a motion vector 130, and the motion vector 130 is encoded like the residual block. The temporal prediction is also referred to as an inter prediction or an inter frame prediction.

The spatial prediction corresponds to a prediction of obtaining a predicted pixel value of a target block by using a reconstructed pixel value of a reference block adjacent to the target block in one frame, and is also referred to as a directional intra-prediction (hereinafter, simply referred to as an "intra-prediction") or an inter frame prediction. H.264 defines an encoding/decoding by using the intra-prediction.

The intra-prediction scheme predicts values of a current subblock by using a copy in a determined direction of one subblock based on adjacent pixels located in an upper direction and a left direction with respect to the subblock and encodes only their differential. According to the intra-prediction scheme based on the H.264 standard, a predicted block for a current block is generated based on another block having a prior coding order. Further, a coding is carried out on a value generated by subtracting the predicted block from the current block. A video encoder based on the H.264 standard selects from prediction modes a prediction mode having the smallest difference between the current block and the predicted block for each block.

The intra-prediction based on the H.264 standard provides 9 prediction modes shown in FIG. 2 in consideration of the prediction directivity and positions of adjacent pixels used for generating predicted pixel values of a 4×4 luma block and an 8×8 luma block. The 9 prediction modes are divided into a vertical prediction mode (prediction mode 0), a horizontal prediction mode (prediction mode 1), a DC prediction mode (prediction mode 2), a diagonal_down_left prediction mode (prediction mode 3), a diagonal_down- _right prediction mode (prediction mode 4), a vertical_right prediction mode (prediction mode 5), a horizontal_down prediction mode (prediction mode 6), a vertical_left prediction mode (prediction mode 7), and a horizontal_up prediction mode (prediction mode 8) according to their prediction directions. Here, the DC prediction mode uses an average value of eight adjacent pixels.

Further, 4 intra-prediction modes are used for an intra-prediction processing for a 16×16 luma block, wherein the 4 intra-prediction modes are the vertical prediction mode (prediction mode 0), the horizontal prediction mode (prediction mode 1), the DC prediction mode (prediction mode 2), and the diagonal_down_left prediction mode (prediction mode 3). In addition, the same 4 intra-prediction modes are used for an intra-prediction processing for an 8×8 chroma block.

Figure 3:
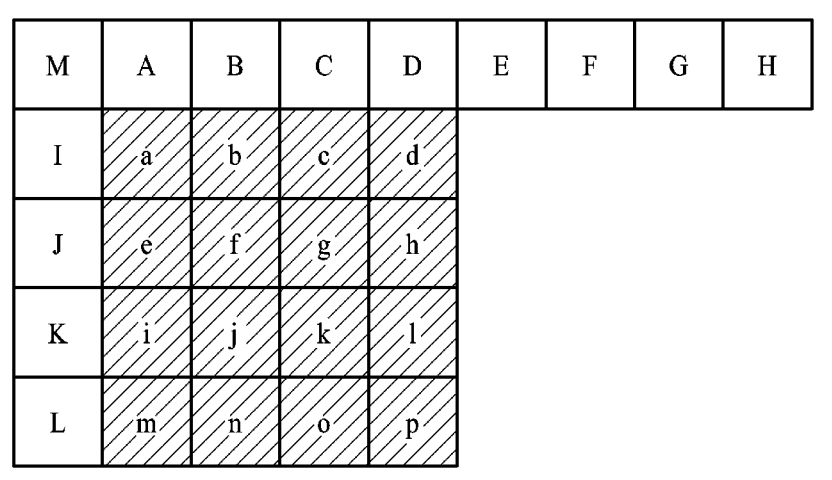

FIG. 3 illustrates a labeling example for the 9 intra-prediction modes shown in FIG. 2. In this event, a predicted block (an area including a to p) for the current block is generated using samples (A to M) decoded in advance. When E, F, G, and H cannot be decoded in advance, E, F, G, and H can be virtually generated by copying D into their positions.

Figure 4:
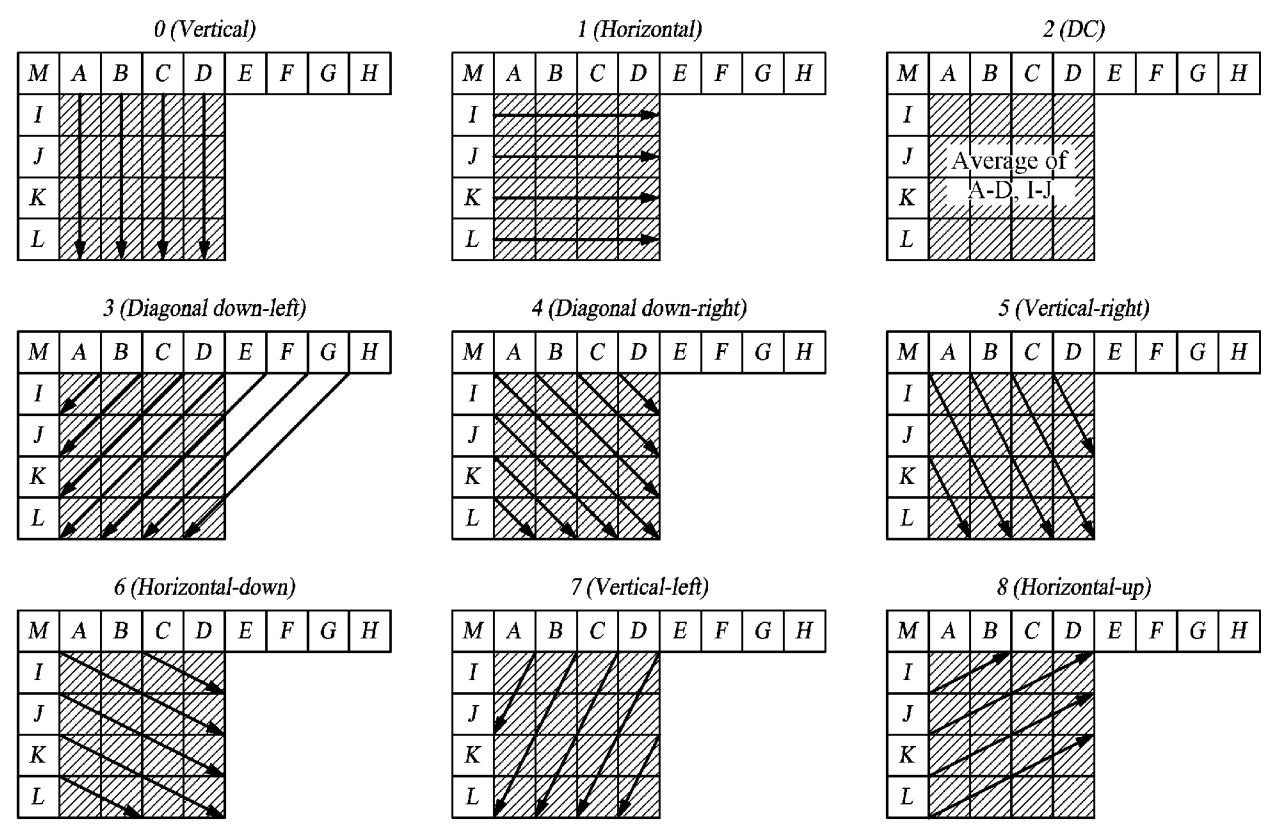

FIG. 4 is a diagram for illustrating the 9 prediction modes shown in FIG. 2 by using FIG. 3. Referring to FIG. 4, a predicted block in a case of the prediction mode 0 predicts pixel values in the same vertical line as the same pixel value. That is, in pixels of the predicted block, pixel values are predicted from pixels, which are most adjacent to a reference block located in an upper side of the predicted block. Reconstructed pixel values of an adjacent pixel A are set to predicted pixel values of a pixel a, pixel e, pixel i, and pixel m in a first column of the predicted block. Further, in the same way, pixel values of a pixel b, pixel f, pixel j, and pixel n in a second column are predicted from reconstructed pixel values of an adjacent pixel B, pixel values of a pixel c, pixel g, pixel k, and pixel o in a third column are predicted from reconstructed pixel values of an adjacent pixel C, and pixel values of a pixel d, pixel h, pixel l, and pixel p in a fourth column are predicted from reconstructed pixel values of an adjacent pixel D. As a result, a predicted block in which predicted pixel values of each column correspond to pixel values of the pixel A, pixel B, pixel C, and pixel D is generated as shown in FIG. 5A.

Further, a predicted block in a case of the prediction mode 1 predicts pixel values in the same horizontal line as the same pixel value. That is, in pixels of the predicted block, pixel values are predicted from pixels, which are most adjacent to a reference block located in a left side of the predicted block. Reconstructed pixel values of an adjacent pixel I are set to predicted pixel values of a pixel a, pixel b, pixel c, and pixel d in a first row of the predicted block. Further, in the same way, pixel values of a pixel e, pixel f, pixel g, and pixel h in a second row are predicted from reconstructed pixel values of an adjacent pixel J, pixel values of a pixel i, pixel j, pixel k, and pixel l in a third row are predicted from reconstructed pixel values of an adjacent pixel K, and pixel values of a pixel m, pixel n, pixel o, and pixel p in a fourth row are predicted from reconstructed pixel values of an adjacent pixel L. As a result, a predicted block in which predicted pixel values of each column correspond to pixel values of the pixel I, pixel J, pixel K, and pixel L is generated as shown in FIG. 5B.

Furthermore, pixels of a predicted block in a case of the prediction mode 2 are equally replaced with an average of pixel values of upper pixels A, B, C, and D, and left pixels I, J, K, and L.

Meanwhile, pixels of a predicted block for prediction mode 3 are interpolated in lower-left direction at an angle of 45° between the lower-left side and the upper-right side of the predicted block, and pixels of a predicted block for prediction mode 4 are extrapolated in lower-right direction at an angle of 45° between a lower-left side and an upper-right side of the predicted block. Further, pixels of a predicted block for prediction mode 5 are extrapolated in a lower-right direction at an angle of about 26.6° (width/height=½) with respect to a vertical line. In addition, pixels of a predicted block for prediction mode 6 are extrapolated in a lower-right direction at an angle of about 26.6° with respect to a horizontal line, pixels of a predicted block for prediction mode 7 are extrapolated in a lower-left direction at an angle of about 26.6° with respect to a vertical line, and pixels of a predicted block for prediction mode 8 are interpolated in an upper direction at an angle of about 26.6° with respect to a horizontal line.

In the prediction modes 3 to 8, the pixels of the predicted block can be generated from a weighted average of the pixels A to M of the reference block decoded in advance. For example, in the case of prediction mode 4, the pixel d located in an upper right side of the predicted block can be estimated as shown in Formula 1. Here, a round( ) function is a function of rounding off to the nearest whole number.

$$d=\text{round}(B/4+C/2+D/4) \qquad \text{Formula 1}$$

Meanwhile, in a 16×16 prediction model for luma components, there are 4 modes including the prediction mode 0, prediction mode 1, prediction mode 2, and prediction mode 3 as described above.

In a case of the prediction mode 0, pixels of the predicted block are interpolated from upper pixels, and, in a case of the prediction mode 1, the pixels of the predicted block are interpolated from left pixels. Further, in a case of the prediction mode 2, the pixels of the predicted block are calculated as an average of the upper pixels and the left pixels. Lastly, in a case of the prediction mode 3, a linear "plane" function suitable for the upper pixels and the left pixels is used. The prediction mode 3 is more suitable for an area in which the luminance is smoothly changed.

As described above, in the H.264 standard, pixel values of the predicted block are generated in directions corresponding to respective modes based on adjacent pixels of the predicted block to be currently encoded in the respective prediction modes except for the DC mode.

However, there is a case where an accurate prediction is difficult to be performed only using the 9 modes as an image characteristic demands, and, in this event, the encoding efficiency can be deteriorated. For example, a certain image includes patterns having specific directivity, but the directivity may not exactly correspond with the aforementioned 8 directions. In this case, if the number of directivity modes is increased, an amount of information to be encoded may be significantly increased in comparison with the encoding efficiency, so increasing the number of directivity modes is not preferable.

That is, in the majority of cases, it is sufficient to perform the accurate prediction only with current directivity modes. However, since there is a limit to a direction of each prediction mode according to an image, a pixel value of a predicted block may not be accurately predicted due to the deterioration of the encoding efficiency. In this event, a sufficient gain of an entropy encoding cannot be obtained because of the inaccurate intra-prediction and thus a bit rate is unnecessarily increased.

DISCLOSURE

Technical Problem

To solve the above-mentioned problems, an embodiment of the present disclosure provides a video encoding apparatus and an encoding method thereof, a video decoding apparatus and a decoding method thereof, and a directional intra-prediction method to be used therefor, which can improve the accuracy and efficiency of an intra-prediction in a video encoding while minimizing an increase in overheads.

SUMMARY

An embodiment of the present disclosure provides a video encoding apparatus including: a main mode search unit for searching for a main mode for a current block from among directional intra-prediction modes; a sub mode search unit for searching for sub modes formed by inclining an indicated orientation of the main mode found by the main mode search unit by a predetermined offset in both of a clockwise direction and a counterclockwise direction; a predicted block generator for generating a predicted block of the current block from neighboring blocks of the current block based on the main mode found by the main mode search unit and the sub modes found by the sub mode search unit; a differentiator for calculating a differential between the current block and the predicted block; and an encoder for encoding the differential calculated by the differentiator.

Here, the sub mode search unit preferably searches for the sub mode by moving referenced adjacent pixels in a neighboring block in horizontal or vertical direction by unit of pixels or unit of half pixels.

In this case, the sub mode search unit preferably searches for the sub mode by using a copy of a pixel existing before a movement when there are none in the adjacent pixels to be referenced after the movement in the horizontal or vertical direction.

Another embodiment of the present disclosure provides a video decoding apparatus including: a decoder for extracting a main mode, a sub mode, and a texture data for a directional intra-prediction from an input bitstream; an inverse quantizer for inversely quantizing the texture data extracted by the decoder; an inverse spatial transformer for reconstructing a residual image of a current block from coefficients generated by an inverse quantization by the inverse quantizer; and an inverse intra predictor for generating a predicted block of the current block by using the main mode and the sub mode extracted by the decoder and reconstructing the current block by adding a generated predicted block and the residual image reconstructed by the inverse spatial transformer.

Here, the inverse intra predictor preferably moves adjacent pixels of a neighboring block in horizontal or vertical direction by unit of pixels or unit of half pixels according to the sub mode by using the main mode as a reference, and generates the predicted block from moved adjacent pixels based on the main mode.

In this case, the inverse intra predictor preferably makes a copy of a pixel existing before a movement when there are none in the adjacent pixels to be referenced after the movement, and generates the predicted block from the moved adjacent pixels and the copy of the pixel based on the main mode.

Yet another embodiment of the present disclosure provides a directional intra-prediction method, including: searching for a main mode for a current block from among directional intra-prediction modes; searching for sub modes formed by inclining an indicated orientation of a found main mode by a predetermined offset in both of a clockwise direction and a counterclockwise direction; and generating a predicted block of the current block from a neighboring block of the current block based on the found main mode and found sub modes.

Here, the process of searching for the sub modes may include moving referenced adjacent pixels in the neighboring block in horizontal or vertical direction.

In addition, the process of searching for the sub modes may include moving referenced adjacent pixels in the neighboring block in horizontal or vertical direction and making a copy of a pixel existing before a movement when there are none in the adjacent pixels to be referenced after the movement in the horizontal or vertical direction.

Here, the process of searching for the sub modes preferably comprises inclining the indicated orientation of the main mode in both of a clockwise direction and a counterclockwise direction by unit of pixels or unit of half pixels.

Yet another embodiment of the present disclosure provides a video encoding method, including: searching for a main mode for a current block from among directional intra-prediction modes; searching for sub modes formed by inclining an indicated orientation of a found main mode by a predetermined offset in both of a clockwise direction and a counterclockwise direction; generating a predicted block of the current block from a neighboring block of the current block based on the found main mode and found sub modes; calculating a differential between the current block and the predicted block; and encoding the differential calculated by the process of calculating the differential.

Yet another embodiment of the present disclosure provides a video decoding method, including: extracting a main mode, a sub mode, and a texture data for a directional intra-prediction from an input bitstream; inversely quantizing an extracted texture data; reconstructing a residual image of a current block from coefficients generated by an inverse quantization in the process of inversely quantizing the texture data; generating a predicted block of the current block by using an extracted main mode and an extracted sub mode; and reconstructing the current block by adding a generated predicted block and a reconstructed residual image.

Here, the sub modes are formed by inclining an indicated orientation of the main mode by a predetermined offset in both of a clockwise direction and a counterclockwise direction.

Preferably, the process of generating the predicted block of the current block comprises moving adjacent pixels of a neighboring block in horizontal or vertical direction according to the sub mode by using the main mode as a reference. In this case, the predicted block is generated from moved adjacent pixels based on the main mode.

In addition, the video decoding method may further include making a copy of a pixel existing before a movement when there are none in the adjacent pixels to be referenced after the movement by the process of moving the adjacent pixels.

Advantageous Effects

According to the present disclosure as described above, a bit rate is reduced and the accuracy of an intra-prediction can be improved while overheads created in a bitstream generation are not greatly increased in comparison with the H.264 standard.

DESCRIPTION OF DRAWINGS

FIG. 3 is a diagram illustrating an example of the labeling for describing the intra-prediction modes of FIG. 2;

FIG. 4 is a diagram for describing each of the intra-prediction modes of FIG. 2;

FIG. 5A is a diagram illustrating a prediction mode 0 among the intra-prediction modes of FIG. 2, and FIG. 5B is a diagram illustrating a prediction mode 1 among the intra-prediction modes of FIG. 2;

DETAILED DESCRIPTION

Figure 1:
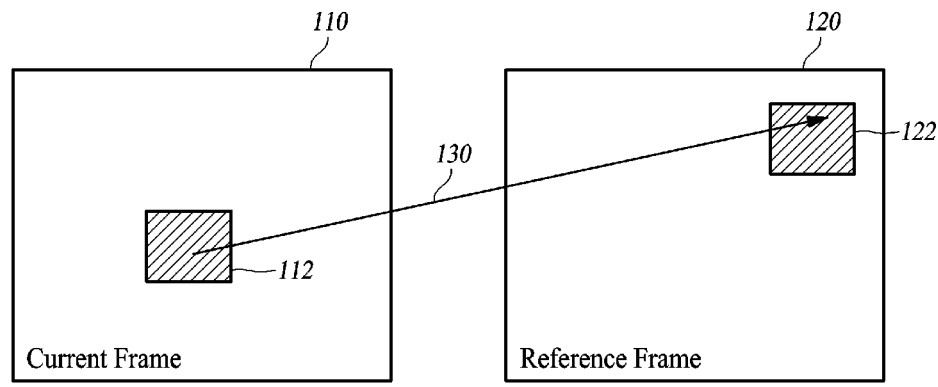
FIG. 1 is a diagram illustrating a general inter prediction.
Figure 2:
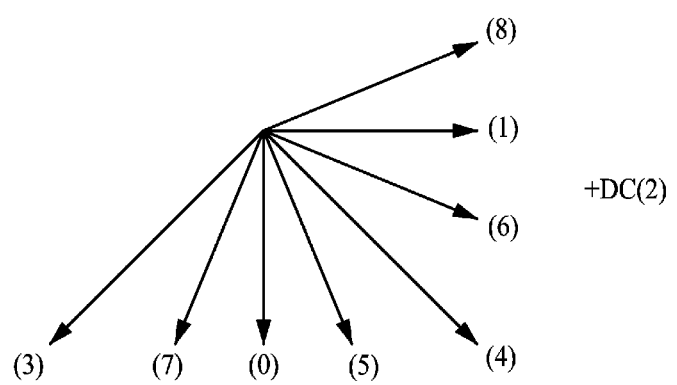
FIG. 2 is a diagram illustrating directivity of intra-prediction modes.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

As a result of an intra-prediction, there are two data to be encoded. One is a texture data of a "residual block" generated from a neighboring block by a differential between a current block and a predicted block, and the other is a data indicating an intra-prediction mode applied for each block. In embodiments according to the present disclosure, a method of efficiently predicting and compressing the intra-prediction mode applied for each block is provided. Here, the "block" is used as a concept including a macroblock or a subblock (8×8, 4×4, etc.) having a size equal to or smaller than the macroblock.

Figures 5, 6:
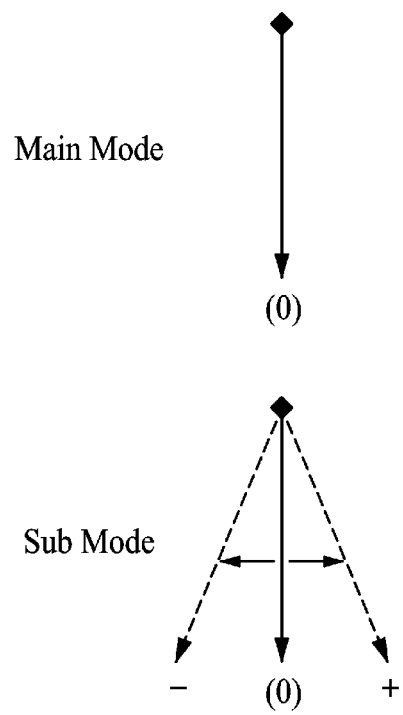
FIG. 6 is a diagram for describing a concept of an embodiment according to the present disclosure.

FIG. 6 is a diagram for describing a basic concept of an embodiment according to the present disclosure. Here, 9 intra-prediction modes according to the H.264 standard are defined as "main modes", and a mode slightly inclined from a direction indicated by the main mode in a clockwise direction and a mode slightly inclined from the direction indicated by the main mode in a counterclockwise direction are defined as "sub modes". Here, a degree of the inclination of the sub mode can be wholly different depending on a selection of those skilled in the art. Hereinafter, it is described for convenience of the description that the clockwise direction is (−) and the counterclockwise direction is (+). In this event, a sub mode is selected considering a fact if the sub mode can further improve the prediction efficiency based on a first selected main mode. FIG. 6 illustrates the prediction mode 0 selected as the main mode.

As shown in FIG. 6, the sub mode can be divided into a mode expressed by 0 indicating that the main mode is used without any change, a mode expressed by (−) indicating an inclination in the clockwise direction, and a mode expressed by (+) indicating an inclination in the counterclockwise direction. The divided sub modes can be expressed by numbers 0, −1, and 1, respectively. In the majority of cases, a sufficient prediction is possible with only the main mode, so 0 (zero) is often selected. Further, the prediction can be efficiently performed with the sub mode itself by way of indicating only a difference with a sub mode of a neighboring block. Accordingly, a value to be coded is often 0 even when the sub mode of the neighboring block and the sub mode of the current block correspond with each other. As described above, since a large number of 0s improves the entropy encoding efficiency in the future, overheads generated by the use of the sub mode are not so large. In this respect, it is noticeable that the encoding efficiency can be improved while the overheads are reduced in comparison with a case of simply increasing the number of main modes.

Figure 7:
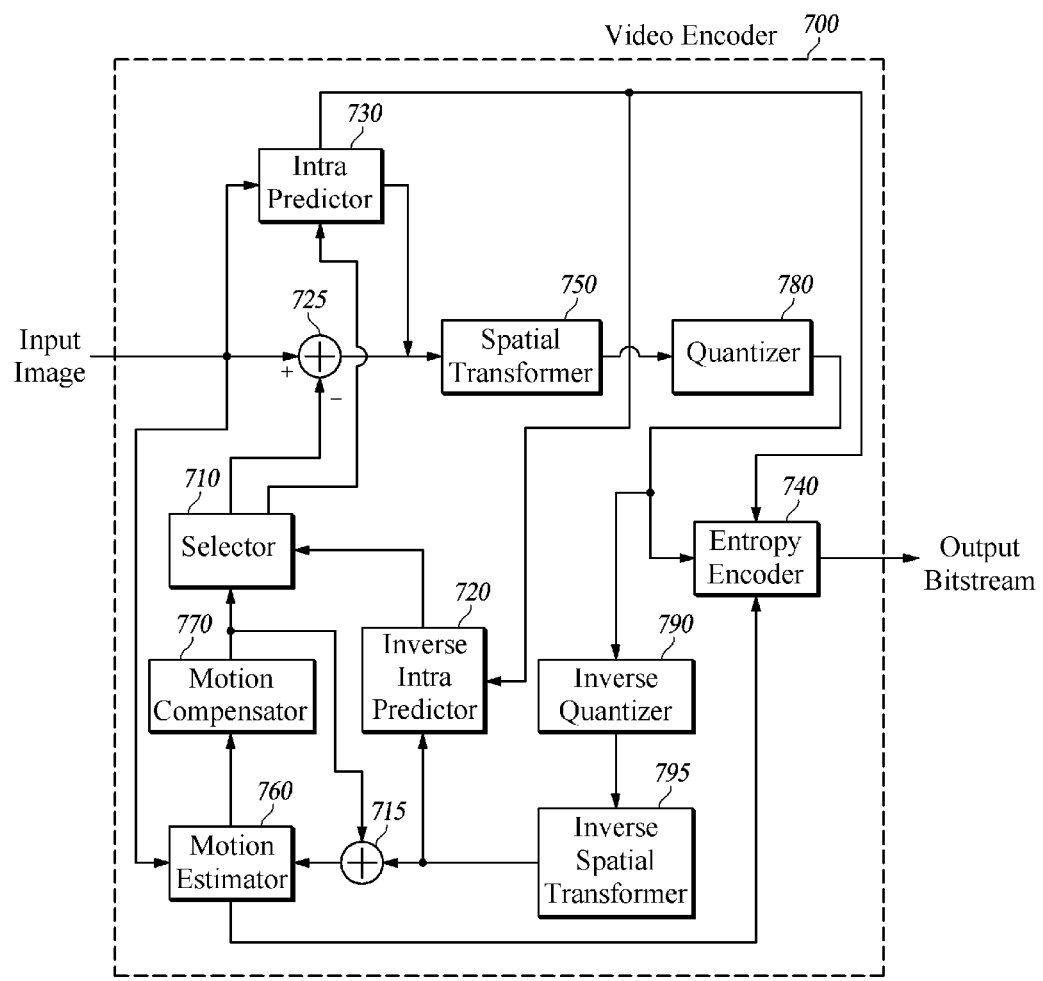
FIG. 7 is a diagram schematically illustrating a video encoder according to an embodiment of the present disclosure.

FIG. 7 is a diagram schematically illustrating a video encoder 700 according to an embodiment of the present disclosure. Referring to FIG. 7, the video encoder 700 may include a selector 710, an adder 715, an inverse intra predictor 720, a differentiator 725, an intra predictor 730, an entropy encoder 740, a spatial transformer 750, a motion estimator 760, a motion compensator 770, a quantizer 780, an inverse quantizer 790, and an inverse spatial transformer 795.

The selector 710 selects a favorable one between the intra-prediction and the inter-prediction. In this event, it is preferable that the selector 710 selects a prediction method in the unit of macroblocks, but the selection is not limited thereto and the prediction method may be selected in the unit of frames or slices. To this end, the selector 710 receives an image reconstructed after being encoded by the inter prediction from the adder 715, and receives an image reconstructed after being encoded by the intra-prediction from the inverse intra predictor 720. The selector determines whether to perform the inter prediction by the differentiator 725 or the intra-prediction by the intra predictor 730. The selector 710 performs an actual encoding on two prediction methods and selects a prediction method having a smaller cost.

Here, the cost (C) can be defined in several types, and can be calculated as defined in Formula 2 representatively based on a rate-distortion. In Formula 2, E denotes a difference between a signal reconstructed by decoding an encoded bit and an original signal, and B denotes an amount of bits spent on each coding. Further, λ denotes a Lagrangian coefficient corresponding to a coefficient which can control reflection ratios of E and B.

$$C=E+\lambda B \quad \text{Formula 2}$$

Figure 8:
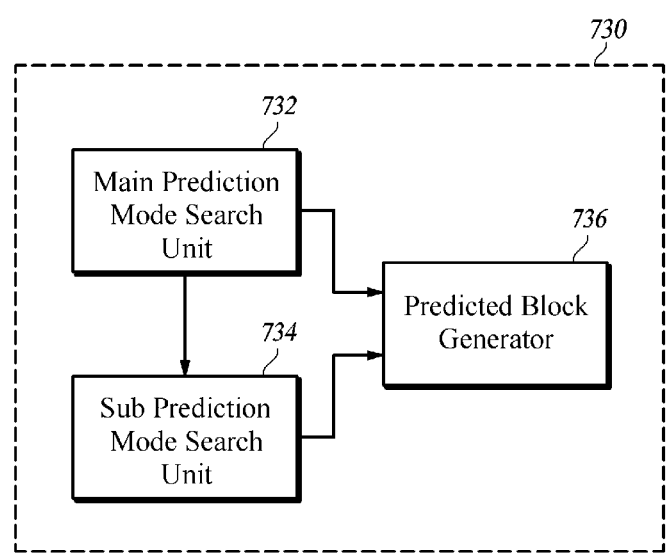
FIG. 8 is a diagram schematically illustrating an example of a construction of an intra predictor of FIG. 7.

In order to perform the intra-prediction according to embodiments of the present disclosure, the intra predictor 730 may include a main mode search unit 732, a sub mode search unit 734, and a predicted block generator 736 as shown in FIG. 8.

The main mode search unit 732 searches for a main mode for a current block (e.g. a 4×4 block) in directional intra-prediction modes. That is, the main mode search unit 732 determines an optimal prediction mode among 9 directional intra-prediction modes according to the H.264 standard as the main mode.

The sub mode search unit 734 determines a sub mode inclined from a direction indicated by the main mode by a predetermined offset in a clockwise direction or a counter-clockwise direction based on the main mode found by the main mode search unit 732 as shown in FIG. 6.

Both determinations of the main mode and the sub mode can be implemented in an aspect of the rate-distortion cost as defined in Formula 2. The main mode may include 9 modes (0 to 8), and the sub mode may include 3 modes (0, 1, and −1). Here, numbers 0, 1, and −1 expressing the sub modes are only examples, and the sub modes can be expressed by numbers 0, 1, and 2 in order not to code a sign.

In this event, since directivity of an image belonging to the current block is often similar to a neighboring block of the current block, a main mode and a sub mode of the current block are highly likely to be similar to a main mode and a sub mode of the neighboring block, respectively. Accordingly, it is preferable to code a differential with a value predicted from the neighboring block rather than directly code a value of the main mode and a value of the sub mode. In a case where the large number of 0s is generated due to such a differential, the entropy coding efficiency in the future is increased. For the main mode, its implementation can be performed in the same manner as the general H.264 standard. However, in a case of the sub mode, its detailed implementation method should be suggested and will be described later.

The predicted block generator 736 generates a predicted block by the determined main mode and sub mode, and obtains a residual block generated by subtracting the predicted block from the current block.

Finally, the intra predictor 730 provides the determined values of the main mode and the sub mode to the entropy encoder 740. In this event, the determined value of the main mode may be a differential with a value of the main mode in the neighboring block, and the determined value of the sub mode may also be a differential with a value of the sub mode in the neighboring block. Further, the intra predictor 730 provides the obtained residual block to the spatial transformer 750 in order to perform a spatial transform such as a DCT, etc.

Meanwhile, operations of elements related to the inter prediction complementarily used with the intra-prediction will be discussed in the following description.

The motion estimator 760 performs a motion estimation of the current frame based on a reference frame among an input video frame, and calculates a motion vector. An algorithm widely used for such a motion estimation is a block matching algorithm. That is, the displacement having the smallest error selected while a given motion block is moving in the unit of pixels within a specific search area of the reference frame is estimated as the motion vector. A motion block having a fixed size can be used for the motion estimation, and a motion block having a variable size can also be used for the motion estimation through a Hierarchical Variable Size Block Matching (HVSBM) method. The motion estimator 760 provides motion data obtained through the motion estimation such as a motion vector, a motion block size, a reference frame number, etc. to the entropy encoder 740. Here, the motion vector may be a differential with a motion vector in the neighboring block.

The motion compensator 770 reduces the temporal redundancy of the input video frame. In this event, the motion compensator 770 generates an inter-predicted frame for the current frame by performing a motion compensation for the reference frame by using the motion vector calculated by the motion estimator 760.

The differentiator 725 removes the temporal redundancy of a video by subtracting the inter-predicted frame from the current frame. An output from the differentiator 725, that is, a residual block in the inter prediction is provided to the spatial transformer 750.

The spatial transformer 750 removes the spatial redundancy for the residual block provided from the intra predictor 730 or the differentiator 725 by using a spatial transform method. As the spatial transform method, a DCT (Discrete Cosine Transform) is mainly used, and a wavelet transform is sometimes used. Coefficients obtained through the spatial transform correspond to transform coefficients. The transform coefficient is referred to as a DCT coefficient when the DCT is used as the spatial transform, and referred to as a wavelet coefficient when the wavelet transform is used as the spatial transform.

The quantizer 780 quantizes the transform coefficient obtained by the spatial transformer 750. The quantization refers to an operation of providing discrete values to regularly divided sections for a transform coefficient, which is expressed by an arbitrary real number value, and then matching the discrete values with predetermined indexes. Particularly, when the wavelet transform is used as the spatial transform method, an embedded quantization method may be used as a quantization method.

The entropy encoder 740 performs a lossless encoding on a transform coefficient quantized by the quantizer 780, motion data provided by the motion estimator 760, or a direction differential provided from the intra predictor 730, and generates a bitstream. As such a loss encoding method, an arithmetic coding, a variable length coding, a Huffman coding, etc. can be used.

Meanwhile, the video encoder 700 uses a closed-loop video encoding scheme in order to reduce drifting errors between an encoder side and a decoder side. To this end, it is preferable that the video encoder 700 further includes an inverse quantizer 790, an inverse spatial transformer 795, an inverse intra predictor 720, etc.

The inverse quantizer 790 inversely quantizes the coefficient quantized by the quantizer 780. Such an inverse quantization process is an inverse process of a quantization process. The inverse spatial transformer 795 inversely spatially transforms a result inversely quantized by the inverse quantizer 790, and provides the inversely quantized result to the adder 715 or the inverse intra predictor 720. In this event, a residual image reconstructed through the inversely spatial transform is provided to the inverse intra predictor 720 when the residual image is a frame generated by the original intra-prediction, and provided to the adder 715 when the residual image is an image generated by the inter prediction.

The adder 715 reconstructs a video frame by adding the residual image provided from the inverse spatial transformer 795 and a previous frame provided from the motion compensator 770 and stored in a frame buffer (not shown), and provides the reconstructed video frame to the motion estimator 760 as the reference frame.

The inverse intra predictor 720 reconstructs the current block from a predicted block obtained from a pre-generated neighboring block by using the residual block included in the residual image, the value of the main mode, and the value of the sub mode. The current block can be simply reconstructed by adding the residual block and the predicted block, and the value of the main mode and the value of the sub mode are used in obtaining the predicted block. A process of obtaining the predicted block based on the determined values of the main mode and the sub mode is the same as that in the intra predictor 730. However, unlike the intra predictor 730, the inverse intra predictor 720 does not require the search process for determining the main mode and the sub mode.

Figure 9:
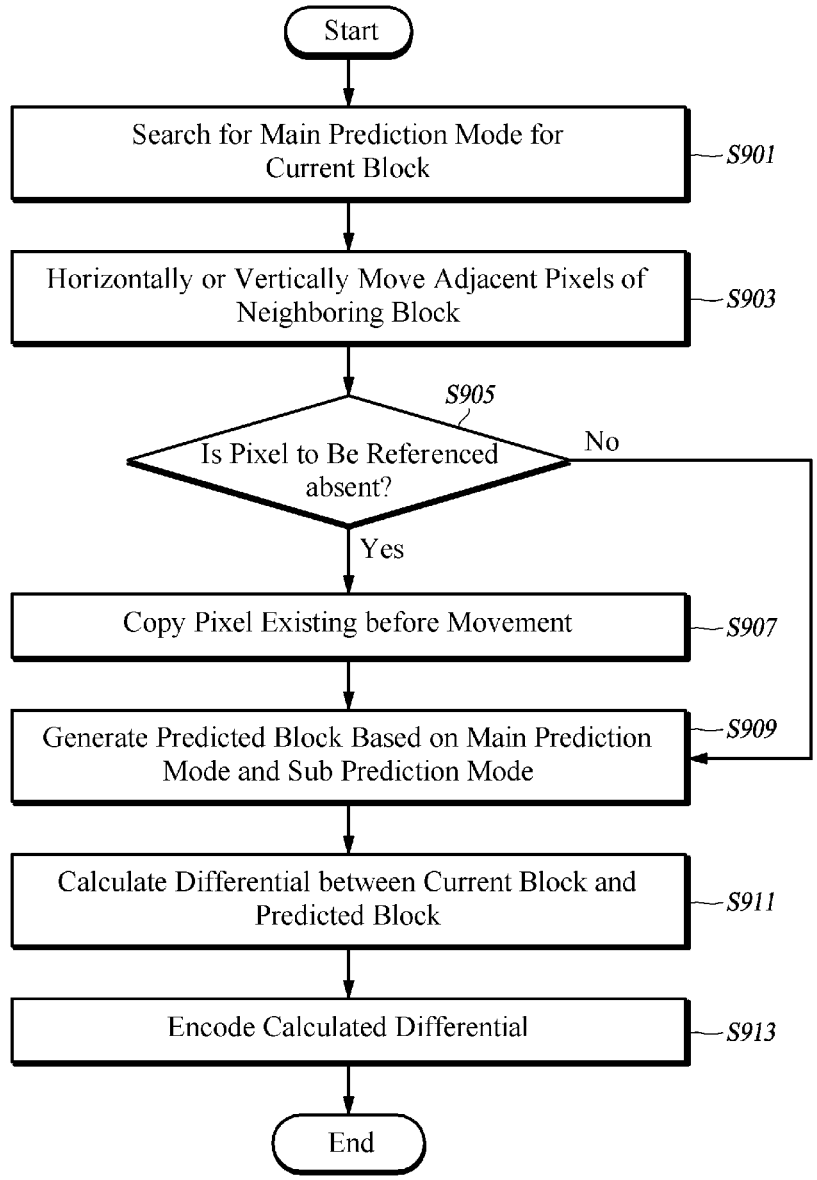
FIG. 9 is a flowchart illustrating a video encoding method carried out by the video encoder of FIG. 7.

FIG. 9 is a flowchart illustrating a video encoding method carried out by the video encoder 700 of FIG. 7.

Referring to FIG. 9, the intra predictor 730 determines an optimal prediction mode for the current block among directional intra-prediction modes as the main mode at step S901 corresponding to a first step. Further, the intra predictor 730 searches for sub modes inclined from a direction indicated by the main mode by a predetermined offset in two directions including a clockwise direction and a counterclockwise direction based on the determined main mode at step S903 corresponding to a second step.

Figure 18:
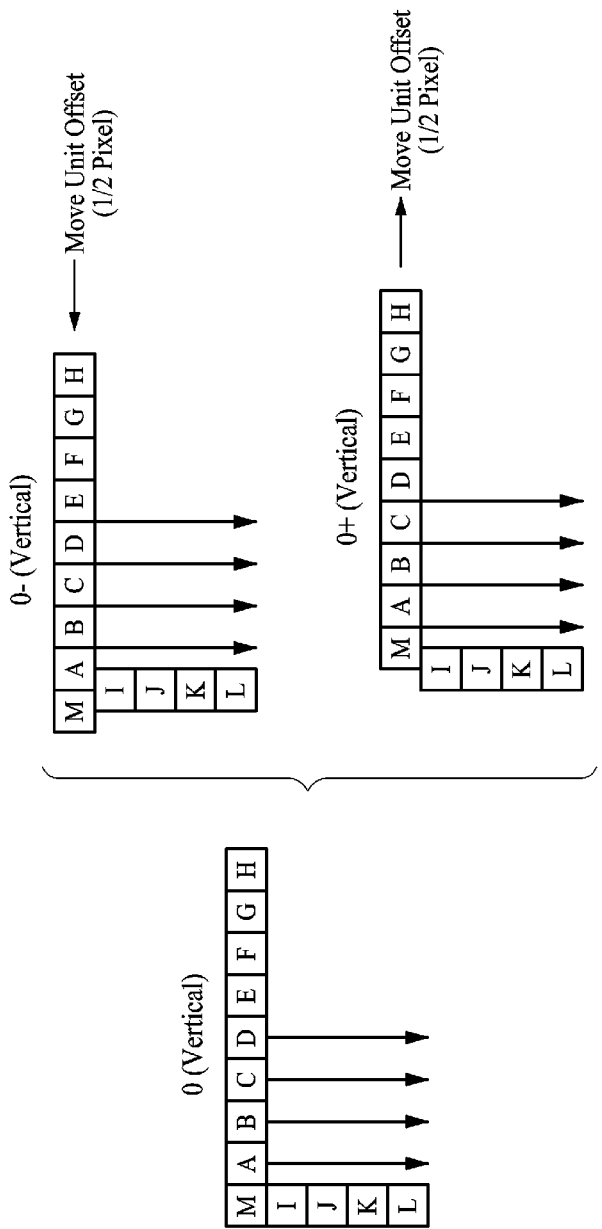
FIGS. 18 and 19 are diagrams illustrating an intra-predicted block generating method according to a second embodiment of the present disclosure.
Figure 19:
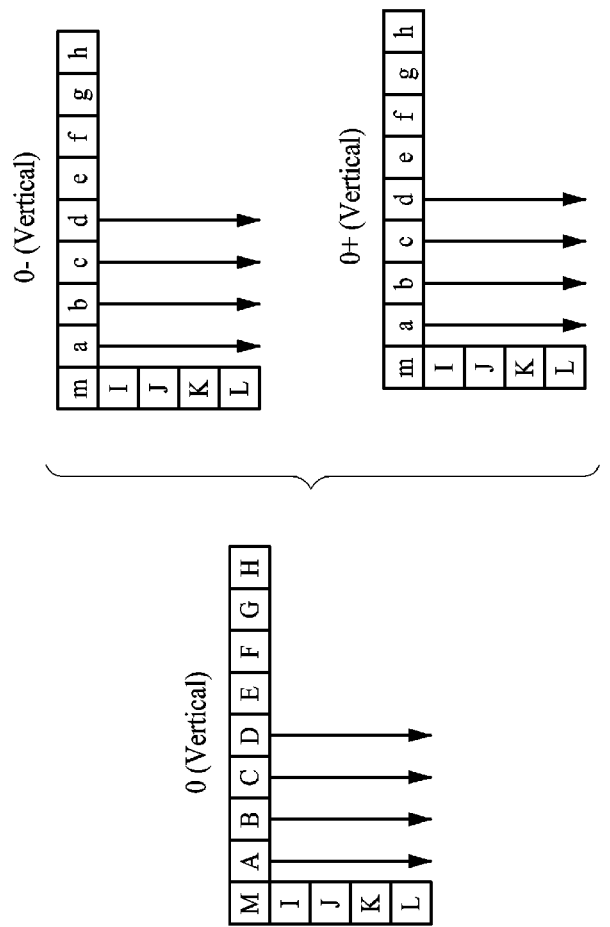
Figure 20:
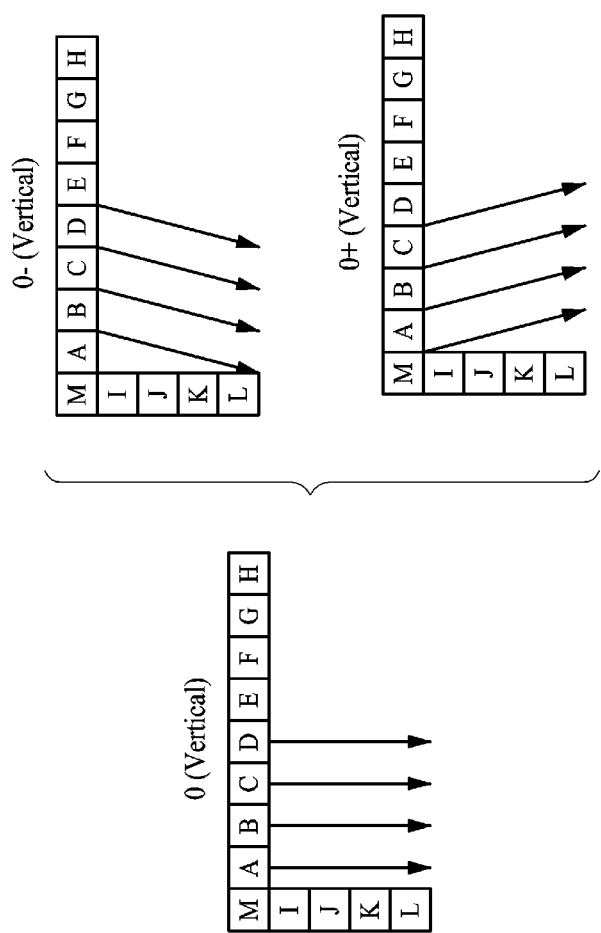
FIG. 20 is a diagram illustrating an intra-predicted block generating method according to a third embodiment of the present disclosure.

The intra predictor 730 and the inverse intra predictor 720 generate the predicted block for the current block from pixels of the neighboring block according to the determined main mode and sub mode at step S909. In this event, FIGS. 10 to 17 illustrate a predicted block generating method according to a first embodiment of the present disclosure, FIGS. 18 and 19 illustrate a predicted block generating method according to a second embodiment of the present disclosure, and FIG. 20 illustrates a predicted block generating method according to a third embodiment of the present disclosure.

First, the predicted block generating method according to the first embodiment of the present disclosure is described with reference to FIGS. 10 to 17.

The predicted block generating method according to the first embodiment uses a scheme of moving pixels of the neighboring block in order to obtain extra modes in the sub mode, that is, two modes by slightly inclining the main mode in two rotational directions. Here, the degree of the inclination (unit offset) can be differently selected by those skilled in the art, but the first embodiment is described based on a one pixel movement.

As described above, the sub mode includes a (−) mode generated by slightly inclining the main mode in the clockwise direction and a (+) mode slightly inclined from the main mode in the counterclockwise direction. Of course, the sub mode includes a mode having no change from the main mode. For example, the (−) mode, the (+) mode, and the mode having no change from the main mode of the sub mode can be indicated by −1, 1, and 0, respectively.

Figure 10:
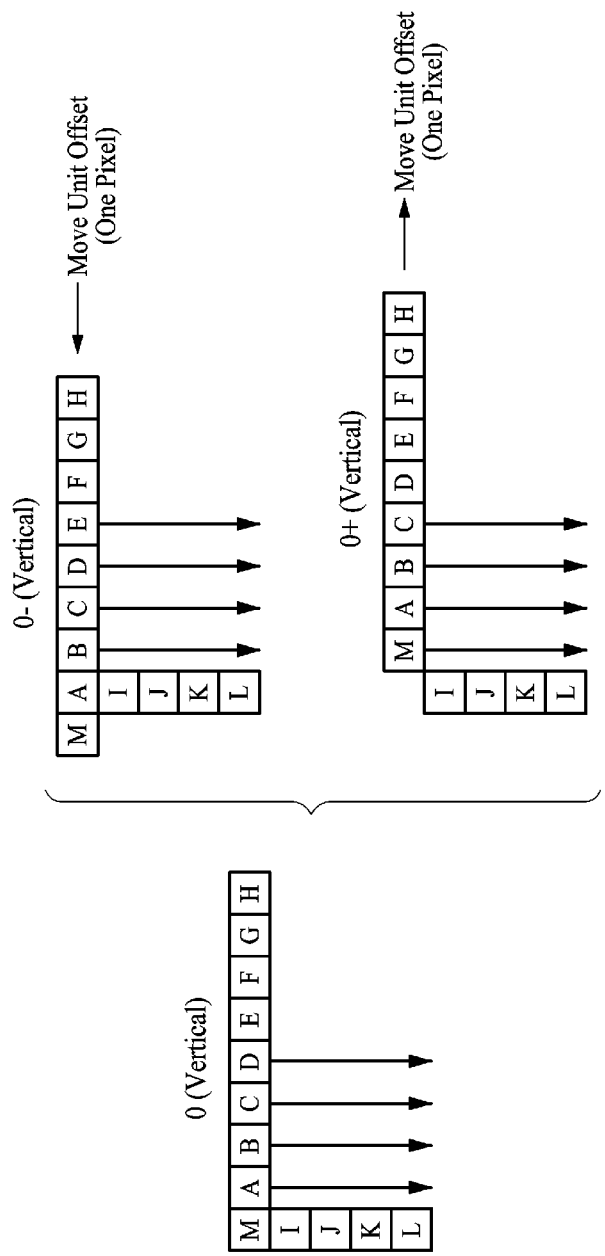
FIGS. 10 to 17 are diagrams illustrating an intra-predicted block generating method according to a first embodiment of the present disclosure.

FIG. 10 illustrates a vertical mode in which the main mode is 0. In this event, a 0− mode (corresponding to a mode in which the main mode is 0 and the sub mode is (−)) among sub modes gives an effect of slightly inclining (rotating) the main mode (vertical mode) in the clockwise direction by moving referenced adjacent pixels of an upper block by one pixel in a left direction. Similarly, a 0+ mode (corresponding to a mode in which the main mode is 0 and the sub mode is (+)) among the sub modes causes a slight inclination of the main mode in the counterclockwise direction by moving the referenced adjacent pixels of the upper block by one pixel in the right direction.

Figure 11:
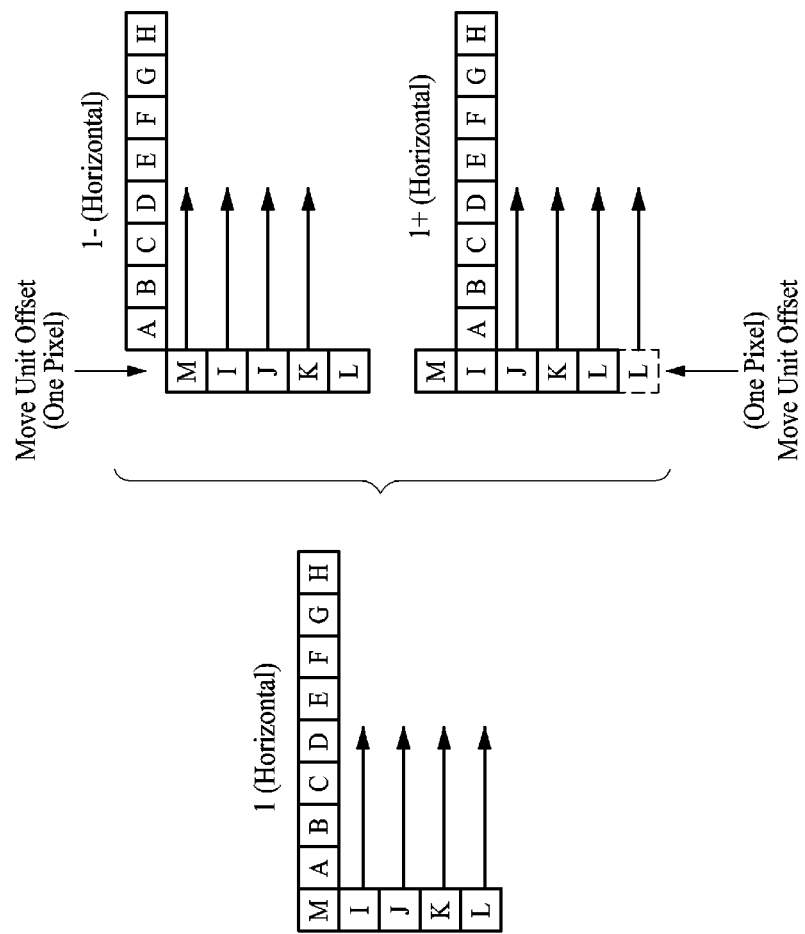

Further, FIG. 11 illustrates a horizontal mode in which the main mode is 1. In this event, a 1− mode (corresponding to a mode in which the main mode is 1 and the sub mode is (−)) among the sub modes causes a slight inclination of the main mode in the clockwise direction by moving referenced adjacent pixels of a left block by one pixel in the bottom direction. Similarly, a 1+ mode (corresponding to a mode in which the main mode is 1 and the sub mode is (+)) among the sub modes causes a slight inclination of the main mode in the counterclockwise direction by moving the referenced adjacent pixels of the left block by one pixel in the top direction. Here, in the case of 1+ mode, once the adjacent pixels are moved in the top direction, pixels located in the lower end of the 4×4 block have no adjacent pixels to reference, at step S905. In such a case, an omitted pixel in the adjacent pixels can be supplemented by making a copy of a pixel L that had existed before the movement at step S907.

Figure 12:
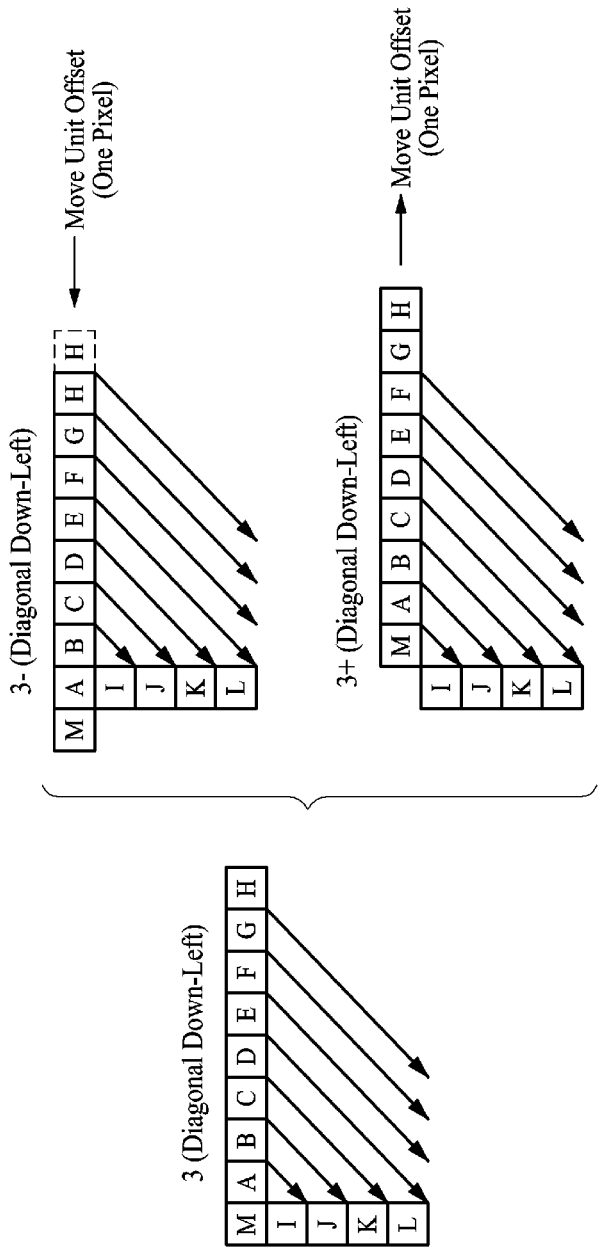

Moreover, FIG. 12 illustrates a diagonal down-left mode in which the main mode is 3. In this event, a 3− mode among the sub modes causes a slight inclination of the main mode in the clockwise direction by moving referenced adjacent pixels of an upper block by one pixel in the left direction. Similarly, a 3+ mode among the sub modes causes a slight inclination of the main mode in the counterclockwise direction by moving the referenced adjacent pixels of the upper block by one pixel in the right direction.

Figure 13:
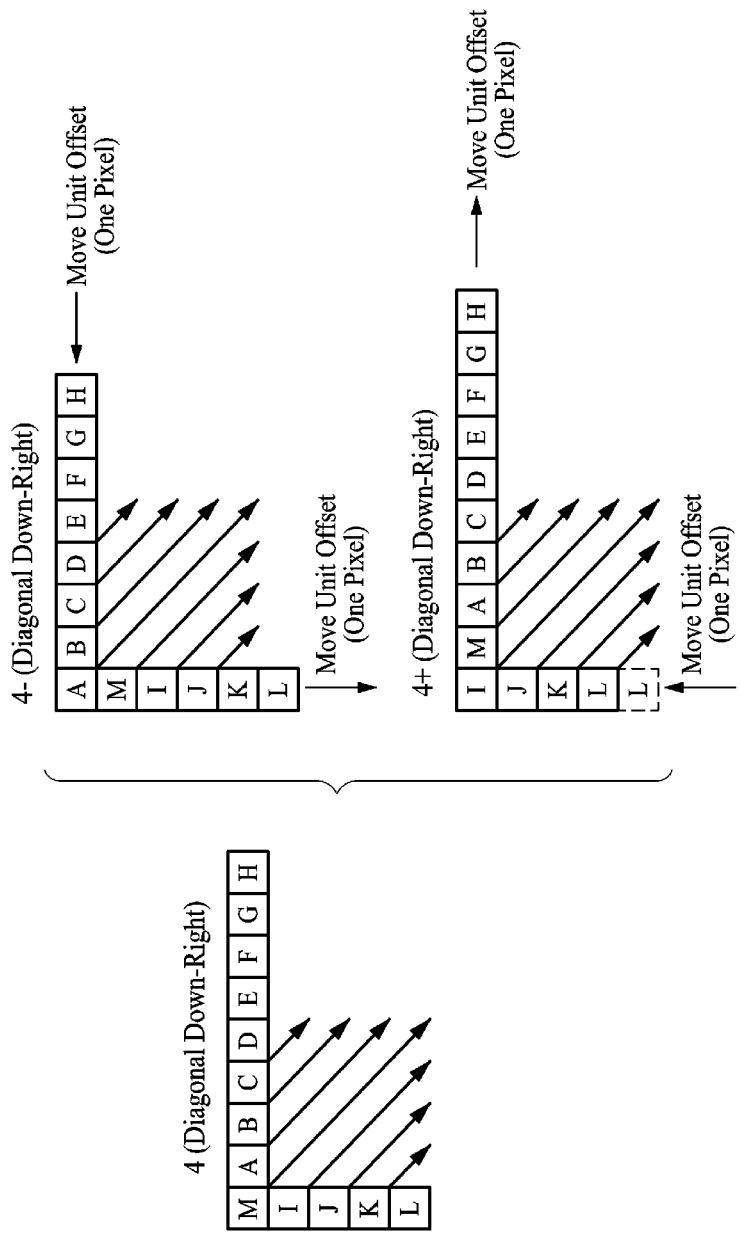

Furthermore, FIG. 13 illustrates a diagonal down-right mode in which the main mode is 4. In this event, a 4− mode among the sub modes causes a slight inclination of the main mode in the clockwise direction by moving referenced adjacent pixels of an upper block by one pixel in the left direction and referenced adjacent pixels of a left block by one pixel in the bottom direction. Similarly, a 4+ mode among the sub modes causes a slight inclination of the main mode in the counterclockwise direction by moving the referenced adjacent pixels of the upper block by one pixel in the right direction and the referenced adjacent pixels of the left block by one pixel in the top direction. Here, in the case of 4+ mode, when the adjacent pixels are moved in the top direction, pixels located in a lower end of the 4×4 block have no adjacent pixels to reference, at step S905. In such a case, as described above, an omitted pixel in the adjacent pixels can be supplemented by using a copy of a pixel L that had existed before the movement at step S907.

Figure 14:
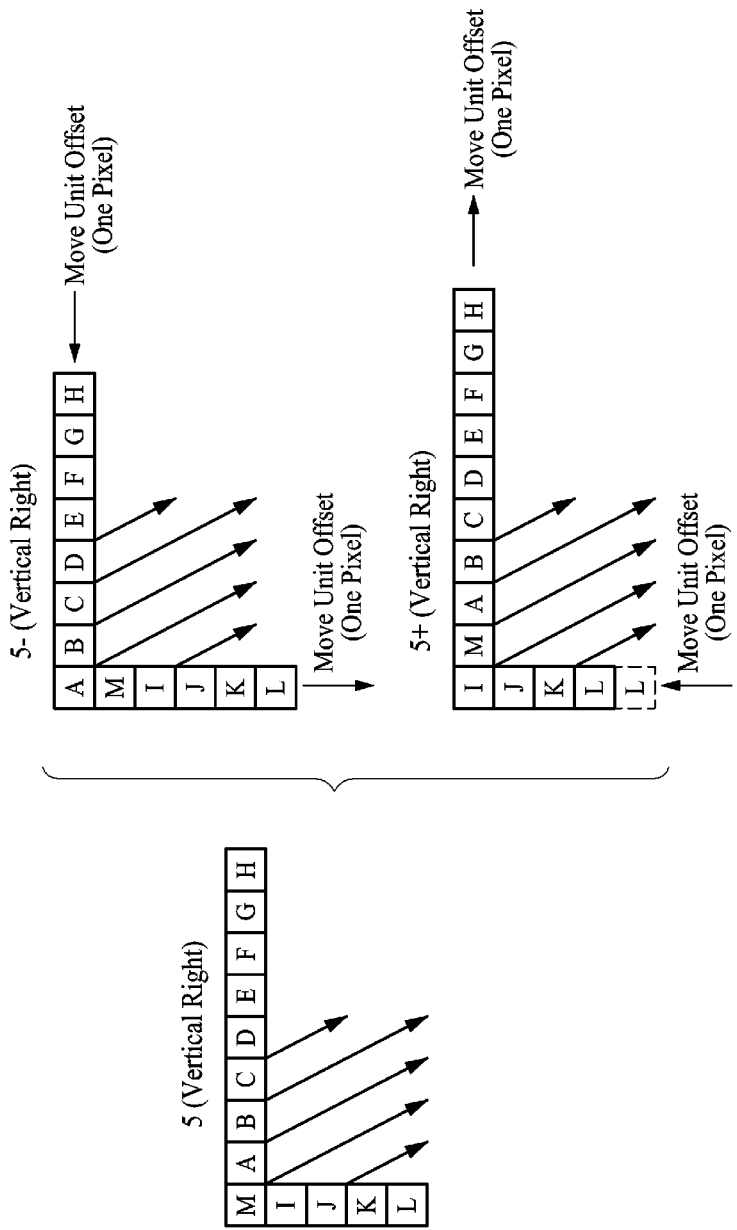

In addition, FIG. 14 illustrates a vertical-right mode in which the main mode is 5. In this event, a 5− mode among the sub modes causes a slight inclination of the main mode in the clockwise direction by moving referenced adjacent pixels of an upper block by one pixel in the left direction and referenced adjacent pixels of a left block by one pixel in the bottom direction. Similarly, a 5+ mode among the sub modes causes a slight inclination of the main mode in the counterclockwise direction by moving the referenced adjacent pixels of the upper block by one pixel in the right direction and the referenced adjacent pixels of the left block by one pixel in the top direction. Here, in the case of 5+ mode, when the adjacent pixels are moved in the top direction, pixels located in a lower end of the 4×4 block have no adjacent pixels to reference, at step S905. In such a case, as described above, an omitted pixel in the adjacent pixels can be supplemented by using a copy of a pixel L that had existed before the movement at step S907.

Figure 15:
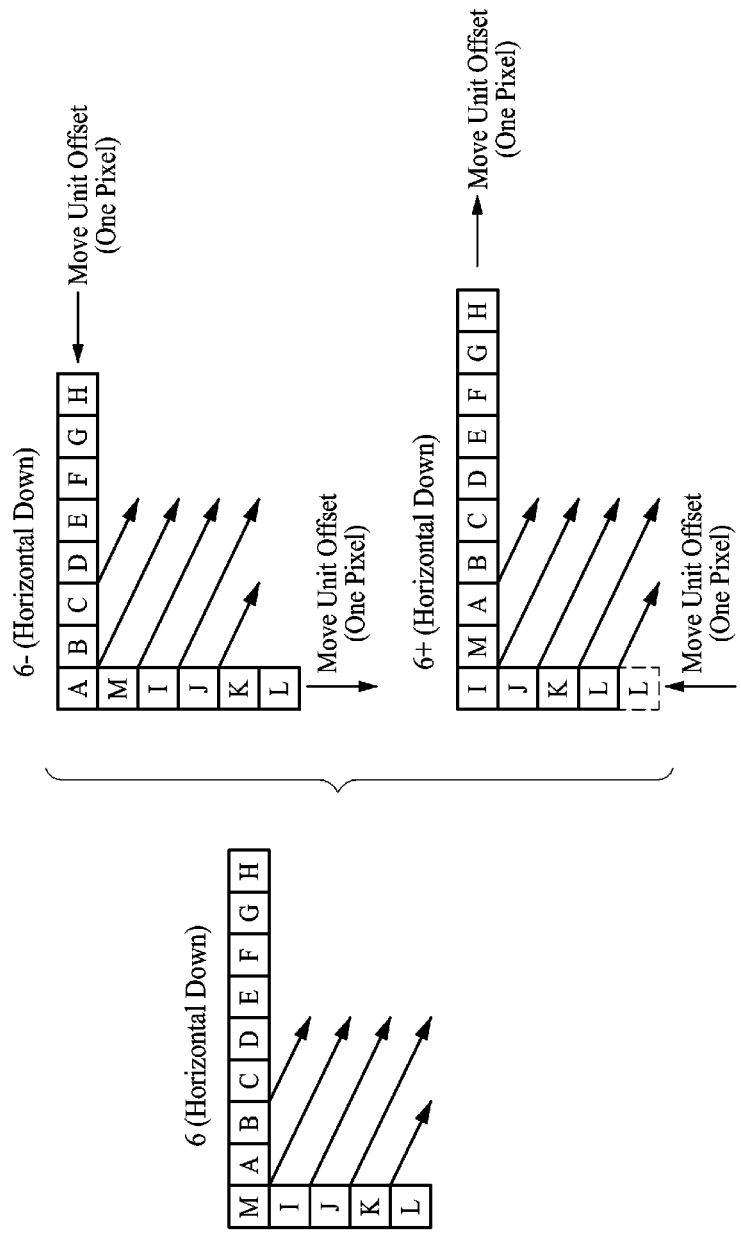

Further, FIG. 15 illustrates a horizontal-down mode in which the main mode is 6. In this event, a 6− mode among the sub modes causes a slight inclination of the main mode in the clockwise direction by moving referenced adjacent pixels of an upper block by one pixel in the left direction and referenced adjacent pixels of a left block by one pixel in the bottom direction. Similarly, a 6+ mode among the sub modes causes a slight inclination of the main mode in the counter-clockwise direction by moving the referenced adjacent pixels of the upper block by one pixel in the right direction and the referenced adjacent pixels of the left block by one pixel in the top direction. Here, in the case of 6+ mode, when the adjacent pixels are moved in the top direction, pixels located in the lower end of the 4×4 block have no adjacent pixels to reference, at step S905. In such a case, as described above, an omitted pixel in the adjacent pixels can be supplemented by using a copy of a pixel L that had existed before the movement at step S907.

Figure 16:
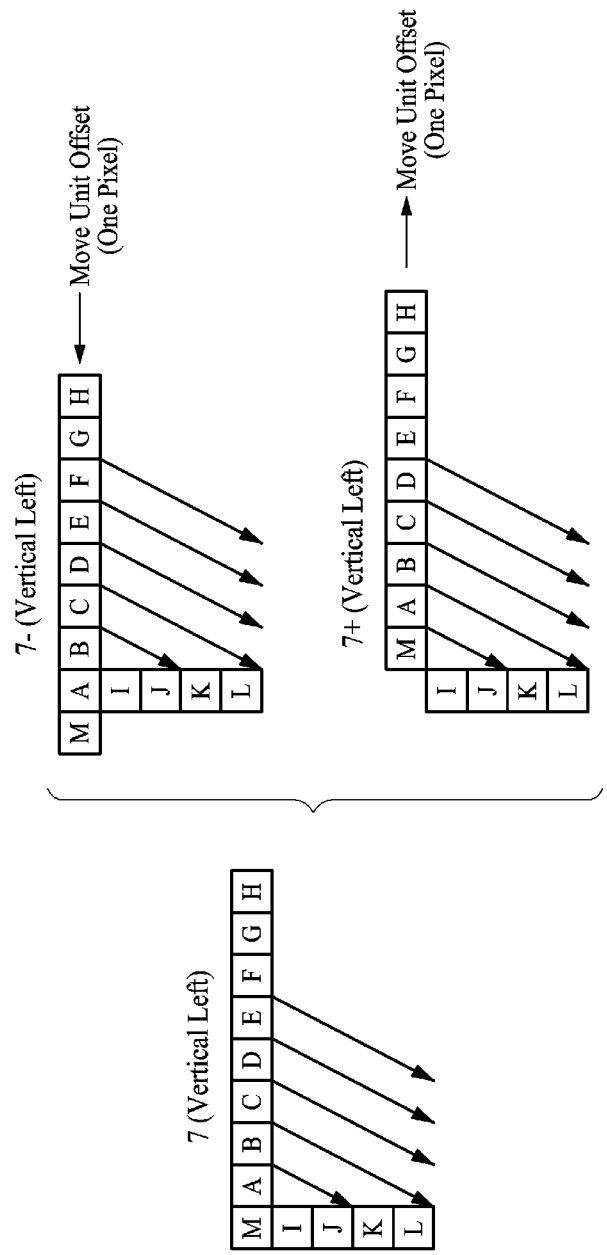

Further, FIG. 16 illustrates a vertical-left mode in which the main mode is 7. In this event, a 7− mode among the sub modes causes a slight inclination of the main mode in the clockwise direction by moving referenced adjacent pixels of an upper block by one pixel in the left direction. Similarly, a 7+ mode among the sub modes causes a slight inclination of the main mode in the counterclockwise direction by moving the referenced adjacent pixels of the upper block by one pixel in the right direction.

Figure 17:
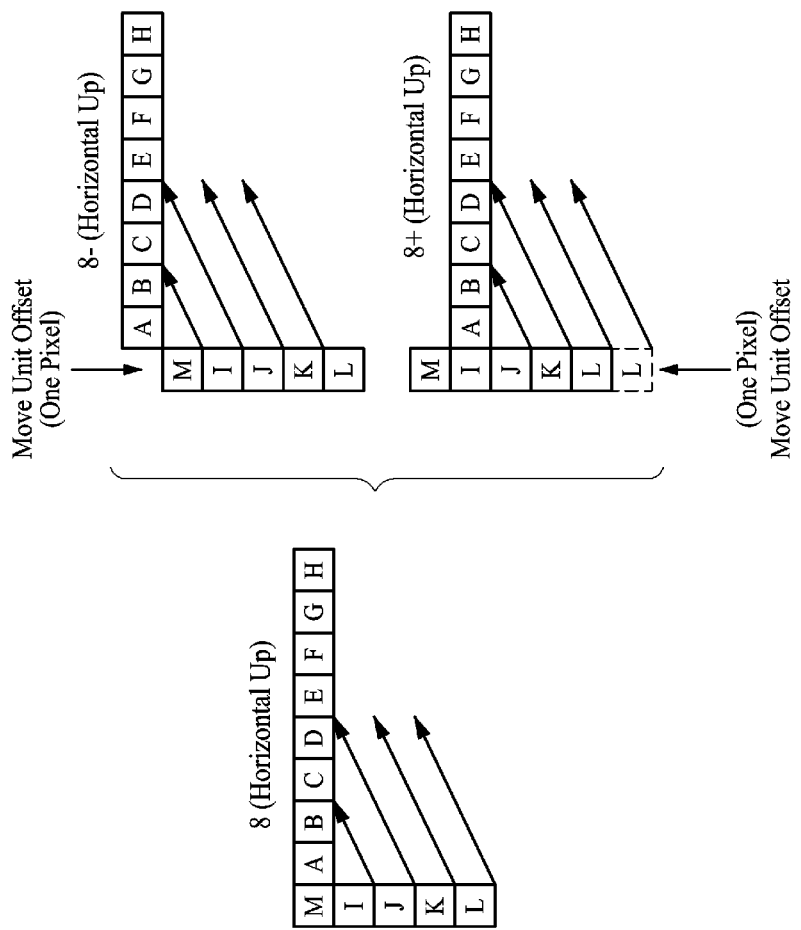

Further, FIG. 17 illustrates a horizontal-up mode in which the main mode is 8. In this event, an 8− mode among the sub modes causes a slight inclination of the main mode in the clockwise direction by moving referenced adjacent pixels of a left block by one pixel in the bottom direction. Similarly, an 8+ mode among the sub modes causes a slight inclination of the main mode in the counterclockwise direction by moving the referenced adjacent pixels of the left block by one pixel in the top direction. Here, in the case of 8+ mode, when the adjacent pixels are moved in the top direction, pixels located in a lower end of the 4×4 block have no adjacent pixels to reference, at step S905. In such a case, as described above, an omitted pixel in the adjacent pixels can be supplemented by using a copy of a pixel L that had existed before the movement at step S907.

Next, the predicted block generating method according to the second embodiment of the present disclosure will be described with reference to FIGS. 18 and 19. Here, the predicted block generating method according to the second embodiment uses the unit offset of a half pixel unlike the first embodiment using the unit offset of one pixel.

FIG. 18 illustrates a vertical mode in which the main mode is 0. In this event, a 0− mode among the sub modes causes a slight inclination of the main mode in the clockwise direction by moving referenced adjacent pixels of an upper block by ½ pixel in a left direction. Similarly, a 0+ mode among the sub modes causes a slight inclination of the main mode in the counterclockwise direction by moving the referenced adjacent pixels of the upper block by ½ pixel in a right direction.

However, in this event, since actually referenced adjacent pixels do not correspond with pixels of the current block, it is required to re-generate adjacent pixels by an interpolation. FIG. 19 shows a result of the interpolation. In the interpolation, among other various methods, a simple average value calculation can be used as an example. For example, pixels a, b, c, and d of FIG. 19 can be calculated as averages between pixels M and A, pixels A and B, pixels B and C, and pixels C and D, respectively.

Since the method of calculating the predicted block according to the second embodiment is similar to the first embodiment except for the interpolation, redundant descriptions for other main modes will be omitted. Of course, although it has been exemplified that the unit offset is the ½ pixel in the second embodiment, it can be sufficiently understood by those skilled in the art that a case of a ¼ pixel size or another sub pixel size also can be implemented through the same interpolation method.

Next, the predicted block generating method according to the third embodiment of the present disclosure will be described with reference to FIG. 20. Here, the method according to the third embodiment is differentiated from the methods according to the first and second embodiments where a method of moving referenced adjacent pixels is used to generate the inclination effect of the main mode, but the third embodiment utilizes a method of directly inclining the copying direction with the adjacent pixels affixed. FIG. 20 shows examples of two sub modes in the vertical mode in which the main mode is 0. Here, although it is exemplified that a degree of inclination corresponds to one pixel in FIG. 20, the inclination is not limited thereto and an inclination in the unit of half pixels is also possible.

The differentiator 725 obtains the residual block by subtracting the predicted block generated according to the aforementioned predicted block generating methods from the current block at step S911. Further, the intra predictor 730 provides the determined values of the main mode and the sub mode to the entropy encoder 740. In this event, the intra predictor 730 can provide a differential with the value of the main mode in the neighboring block and a differential with the value of the sub mode in the neighboring block to the entropy encoder 740.

The entropy encoder 740 performs a lossless encoding on a transform coefficient quantized by the quantizer 780, motion data provided by the motion estimator 760, or a direction differential provided from the intra predictor 730, and generates a bitstream. Here, since elements related to the inter prediction and their operations are equal to those of FIG. 7, their descriptions will be omitted.

Figure 21:
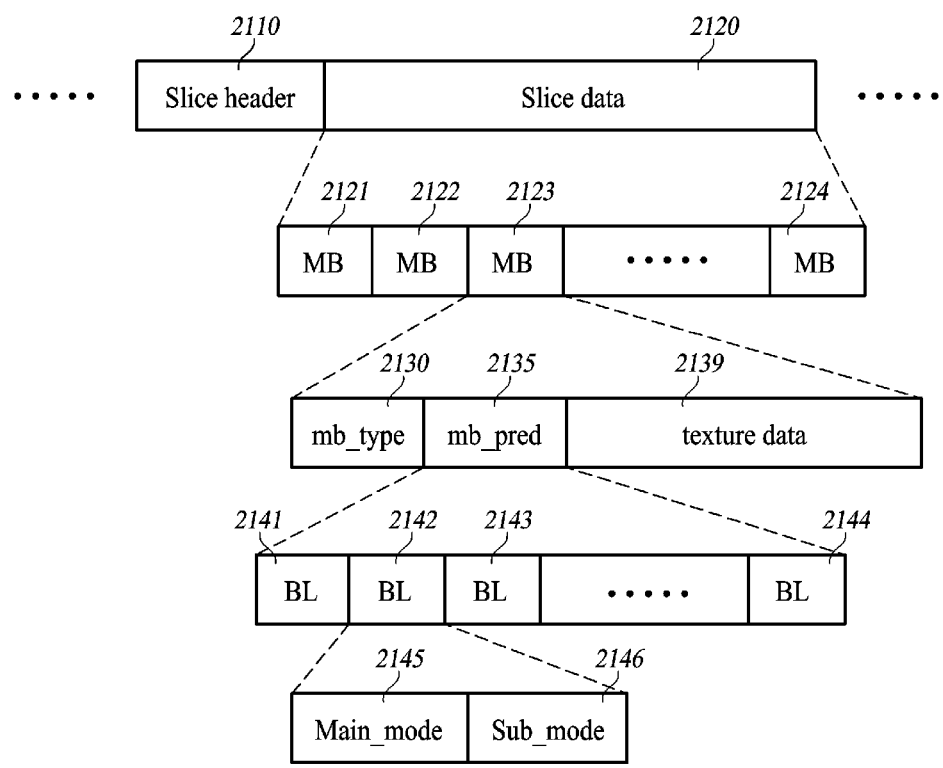
FIG. 21 illustrates an example of a structure of a bitstream generated by the video encoder of FIG. 7.

FIG. 21 illustrates an example of a structure of the bitstream generated by the video encoder of FIG. 7. In the H.264 standard, the bitstream is encoded in the unit of slices. The bitstream 2100 includes a slice header 2110, slice data 2120, and the slice data 2120 includes a plurality of Macroblock Data (MB) 2121 to 2124. Further, one macroblock data 2123 may include an mb-type field 2130, an mb_pred field 2135, and a texture data field 2139.

Here, the mb_type field 2130 records a value indicating a macroblock type. That is, the value recorded in the mb_type field 2130 indicates whether a current macroblock is an intra macroblock or an inter macroblock.

Further, the mb_pred field 2135 records a detailed prediction mode according to the macroblock type. In the case of intra macroblock, information on a prediction mode selected in the intra-prediction is recorded. In the case of inter macroblock, information on a motion vector and a reference frame number for each macroblock partition is recorded.

When the mb_type field 2130 indicates the intra macroblock, the mb_pred field 2135 is divided into a plurality of block information 2141 to 2144, and each information piece 2142 is divided into a main_mode field 2145 for recording the value of a main mode and a sub_mode field 2146 for recording the value of a sub mode.

Lastly, the texture data field 2139 records an encoded residual image, that is, texture data.

Figure 22:
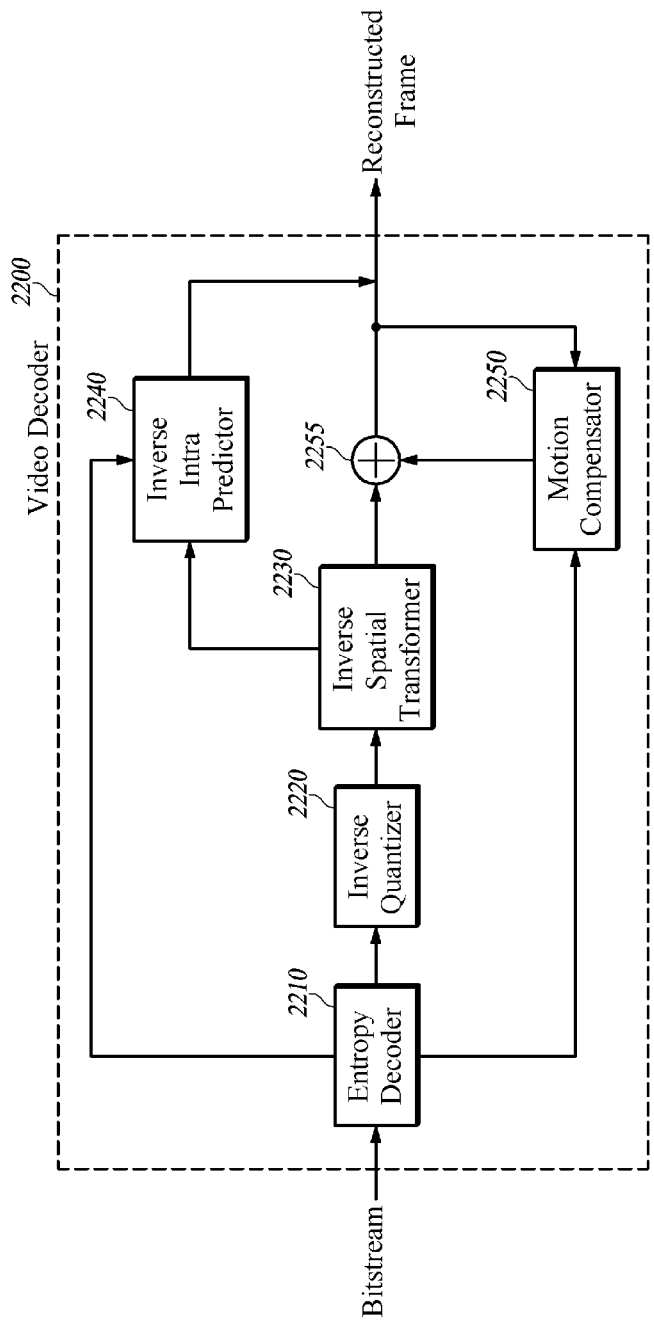
FIG. 22 is a diagram schematically illustrating a video decoder according to another embodiment of the present disclosure.

FIG. 22 schematically illustrates a video decoder 2200 according to another embodiment of the present disclosure.

The video decoder 2200 may include an entropy decoder 2210, an inverse quantizer 2220, an inverse spatial transformer 2230, an inverse predictor 2240, and a motion compensator 2250.

The entropy decoder 2210 performs a lossless decoding in an inverted manner to the entropy decoding, and extracts the motion data (data for a motion vector, a reference frame, etc.) in the inter prediction, the main mode and the sub mode in the intra-prediction, and the texture data, etc. In this event, the entropy decoder 2210 provides the texture data to the inverse quantizer 2220, the motion data to the motion compensator 2250, and the main mode and the sub mode to the inverse intra predictor 2240.

The inverse quantizer 2220 inversely quantizes the texture data transferred from the entropy decoder 2210. An inverse quantization process is for finding a quantized coefficient matched with a value expressed as a predetermined index and transferred from a side of the encoder 700. A table showing the matching relation between the index and the quantized coefficient can be transferred from the side of the encoder 700, and may be prearranged between the encoder and the decoder.

The inverse spatial transformer 2230 inversely performs the spatial transform, and transforms coefficients (frequency area) generated through the inverse quantization into a residual block in a spatial area. For example, the inverse spatial transformer 2230 performs an inverse wavelet transform when the spatial transform is performed by a wavelet method in a side of the video encoder, and performs an inverse DCT transform when the spatial transform is performed by a DCT method in the side of the video encoder.

The inverse intra predictor 2240 reconstructs the current block from the predicted block obtained from a block pre-generated in surroundings of the current block by using the values of the main mode and the sub mode transferred from the entropy decoder 2210 and the residual block provided from the inverse spatial transformer 2230. Of course, such an inverse intra-prediction process is applied only when the current block is encoded in the side of the encoder 700 through the intra-prediction process.

The current block can be simply reconstructed by adding the residual block and the predicted block, and the values of the main mode and the sub mode are used for obtaining the predicted block. A process of obtaining the predicted block based on the determined values of the main mode and the sub mode is equal to that in the intra predictor 730 in the video encoder 700. However, unlike the intra predictor 730, the inverse intra predictor 940 does not require a search process for determining the main mode and the sub mode. One reconstructed macroblock can be formed by a sum of current blocks reconstructed as described above.

Meanwhile, the motion compensator 2250 is used for the reconstruction from the inter prediction. The motion compensator 2250 generates a motion-compensated frame by motion-compensating for a pre-reconstructed frame by using the motion data provided from the entropy decoder 2210. Of course, such a motion compensation process is applied only when the current block to be reconstructed is encoded in the side of the encoder through the inter prediction process.

When the residual block reconstructed in the inverse spatial transformer is generated by the inter prediction, the adder 2255 reconstructs the current block by adding the residual block and a corresponding image provided from the motion compensator 2250 in the motion-compensated frame. One reconstructed macroblock can be formed by a sum of current blocks reconstructed as described above.

Eventually, one reconstructed frame can be generated by combining the macroblock (intra macroblock) reconstructed in the inverse intra predictor 2240 and the macroblock (inter macroblock) reconstructed in the adder 2255.

Figure 23:
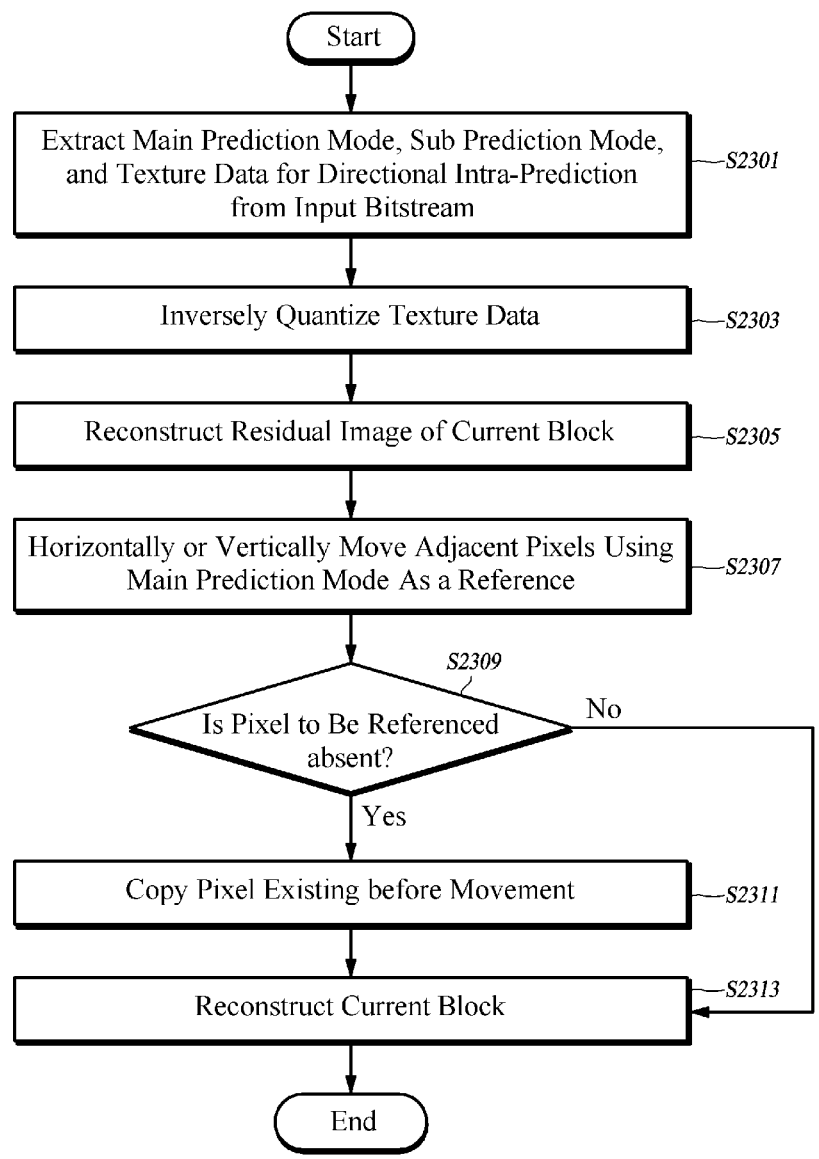
FIG. 23 is a flowchart illustrating a video decoding method carried out by the video decoder of FIG. 22.

FIG. 23 is a flowchart illustrating a video decoding method carried out by the video decoder of FIG. 22.

Referring to FIG. 23, the entropy decoder 2210 performs a lossless decoding in an inverted manner to the entropy decoding, and extracts the motion data (data for a motion vector, a reference frame, etc.) in the inter prediction, the main mode and the sub mode in the intra-prediction, and the texture data, etc. at step S2301 In this event, the entropy decoder 2210 provides the texture data to the inverse quantizer 2220, the motion data to the motion compensator 2250, and the main mode and the sub mode to the inverse intra predictor 2240.

The inverse quantizer 2220 inversely quantizes the texture data transferred from the entropy decoder 2210 at step S2303. The inverse quantization process is for finding a quantized coefficient matched with a value expressed as a predetermined index and transferred from a side of the encoder 700. The table showing the matching relation between the index and the quantized coefficient can be transferred from the side of the encoder 700, and can be prearranged between the encoder and the decoder.

The inverse spatial transformer 2230 inversely performs the spatial transform, and reconstructs a residual image of the current block in a spatial area from coefficients (frequency domain) generated by the inverse quantization at step S2305.

The inverse intra predictor 2240 reconstructs the current block from the predicted block obtained from a block pre-generated in surroundings of the current block by using the values of the main mode and the sub mode transferred from the entropy decoder 2210 and the residual block provided from the inverse spatial transformer 2230 at step S2313. Of course, such an inverse intra-prediction process is applied only when the current block is encoded in the side of the encoder 700 through the intra-prediction process.

In this event, the current block can be simply reconstructed by adding the residual block and the predicted block, and the values of the main mode and the sub mode are used for obtaining the predicted block. A process of obtaining the predicted block based on the determined values of the main mode and the sub mode is equal to that in the intra predictor 730 in the video encoder 700. However, unlike the intra predictor 730, the inverse intra predictor 940 does not require a search process for determining the main mode and the sub mode. That is, the predicted block is generated by horizontally or vertically moving adjacent pixels of the neighboring block by an offset of the main mode or the sub mode according to the value of the sub mode based on the main mode transferred from the entropy decoder 2210 at step S2307. In this event, when any of the moved adjacent pixels does not have a pixel to reference at step S2309, the pixel to reference can be supplemented by making a copy of a pixel that had existed before the movement at step 2311. One reconstructed macroblock can be formed by a sum of current blocks reconstructed as described above.

The respective elements of the aforementioned video encoder and video decoder can represent software or hardware such as an FPGA (Field-Programmable Gate Array) or an ASIC (Application-Specific Integrated Circuit). However, such elements are not limited to software or hardware, and may be constructed to be stored in a storing medium capable of addressing or may be constructed to make one or more processors executed. Functions provided within such elements may be implemented by further subdivided elements, and may be implemented as one element for performing a specific function by combining a plurality of elements.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of a video encoder and a video decoder by improving the accuracy of an intra-prediction while reducing a bit rate without a great increase in overheads in generating the bitstream.

The invention claimed is:

1. An apparatus for encoding a current block, the apparatus comprising:
a main mode search circuit configured to select a main mode of the current block from among a plurality of directional intra-prediction modes;
a sub mode search circuit configured to select a sub mode corresponding to the main mode, wherein the sub mode has a direction defined by rotation of a direction of the main mode by a predetermined angular offset;
a predicted block generator configured to generate a predicted block of the current block from reference pixels in at least one neighboring block adjacent to the current block based on the main mode and the sub mode,
wherein the predicted block generator is configured to shift the reference pixels by one pixel horizontally or vertically and generate the predicted block by using the shifted reference pixels in the direction of the main mode and
wherein a direction of the shifting and the direction of the main mode correspond to the direction of the sub mode;
a differentiator configured to calculate a differential between the current block and the predicted block; and
an encoder configured to encode the differential and information on the main mode and the sub mode.

2. The apparatus of claim 1, wherein the sub mode search circuit is configured to
search for the sub mode, when there is a non-referenceable pixel for the sub mode after the movement of the adjacent reference pixels in the horizontal direction or the vertical direction by unit of pixels, by making a copy of a pixel existing before the movement in a position of the non-referenceable pixel.

3. An apparatus for decoding a current block, the apparatus comprising:
a decoder configured to extract a main mode of the current block, a sub mode of the main mode, and a texture data of the current block for a directional intra-prediction from an input bitstream, wherein the sub mode corresponds to the main mode and the sub mode has a direction defined by rotation of a direction of the main mode by a predetermined angular offset;
an inverse quantizer configured to inversely quantize the texture data of the current block;
an inverse spatial transformer configured to reconstruct a residual image of the current block from coefficients generated by an inverse quantization by the inverse quantizer; and
an inverse intra predictor configured to
generate a predicted block of the current block from reference pixels in at least one neighboring block adjacent to the current block based on the main mode and the sub mode, and
reconstruct the current block by adding the predicted block and the residual image,
wherein the predicted block generator is configured to shift the reference pixels by one pixel horizontally or vertically and generate the predicted block by using the shifted reference pixels in the direction of the main mode, and
wherein a direction of the shifting and the direction of the main mode correspond to the direction of the sub mode.

4. The apparatus of claim 3, wherein the inverse intra predictor is configured to
make, when there is a non-referenceable pixel for the sub mode after the movement of the adjacent reference pixels in the horizontal direction or the vertical direction by unit of pixels, a copy of a pixel existing before the movement in a position of the non-referenceable pixel.

5. A directional intra-prediction method in a video encoding, comprising:
selecting a main mode of a current block from among a plurality of directional intra-prediction modes;
selecting a sub mode corresponding to the main mode, wherein the sub mode has a direction defined by rotation of a direction of the main mode by a predetermined angular offset; and generating a predicted block of the current block from reference pixels in at least one neighboring block adjacent to the current block based on the main mode and the sub mode, wherein the generating of the predicted block includes shifting the reference pixels by one pixel horizontally or vertically and generating the predicted block by using the shifted reference pixels in the direction of the main mode, and wherein a direction of the shifting and the direction of the main mode correspond to the direction of the sub mode.

6. The directional intra-prediction method of claim 5, wherein the selecting of the sub mode of the main mode comprises making, when there is a non-referenceable pixel for the sub mode after the movement of the adjacent reference pixels in the horizontal direction or the vertical direction by unit of pixels, a copy of a pixel existing before the movement in a position of the non-referenceable pixel.

7. A method for encoding a current block, the method comprising:

selecting a main mode of the current block from among a plurality of directional intra-prediction modes;

selecting a sub mode corresponding to the main mode, wherein the sub mode has a direction defined by rotation of a direction of the main mode by a predetermined angular offset;

generating a predicted block of the current block from reference pixels of at least one neighboring block adjacent to the current block based on the main mode and the sub mode of the main mode, wherein the generating of the predicted block includes shifting the reference pixels by one pixel horizontally or vertically and generating the predicted block by using the shifted reference pixels in the direction of the main mode, and wherein a direction of the shifting and the direction of the main mode correspond to the direction of the sub mode;

calculating a differential between the current block and the predicted block; and encoding the differential and information on the main mode and the sub mode.

8. A method for decoding a current block, the method comprising:

extracting a main mode of the current block, a sub mode of the main mode, and a texture data of the current block for a directional intra-prediction from an input bitstream, wherein the sub mode corresponds to the main mode and the sub mode has a direction selected defined by rotation of a direction of the main mode by a predetermined angular offset;

inversely quantizing the extracted texture data of the current block;

reconstructing a residual image of the current block from coefficients generated by an inverse quantization in the step of inversely quantizing the texture data;

generating a predicted block of the current block from reference pixels in at least one neighboring block adjacent to the current block based on the main mode and the sub mode; and reconstructing the current block by adding the predicted block and the residual image, wherein the generating of the predicted block includes shifting the reference pixels by one pixel horizontally or vertically and generating the predicted block by using the shifted reference pixels in the direction of the main mode, and wherein a direction of the shifting and the direction of the main mode correspond to the direction of the sub mode.

9. The method of claim 8, further comprising making, when there is a non-referenceable pixel for the sub mode after the movement of the adjacent reference pixels in the horizontal direction or the vertical direction by unit of pixels, a copy of a pixel existing before the movement in a position of the non-referenceable pixel.

* * * * *